United States Patent

[11] 3,629,608

[72] Inventor Joseph W. Trindle
Augustine Road, Box 577 RD 1, Sellersville, Pa. 18960

[21] Appl. No. 883,924
[22] Filed Dec. 10, 1969
[45] Patented Dec. 21, 1971

[54] REMOTE CONTROL CIRCUITS
7 Claims, 2 Drawing Figs.

[52] U.S. Cl. 307/140, 317/151, 317/154
[51] Int. Cl. H01h 47/00
[50] Field of Search 317/151, 154; 307/140, 173, 109; 340/147; 320/1

[56] References Cited

UNITED STATES PATENTS

| | | | |
|---|---|---|---|
| 2,249,488 | 7/1941 | Nickle | 317/151 X |
| 2,427,751 | 9/1947 | Snyder | 317/151 X |
| 2,788,473 | 4/1957 | Breckman | 317/151 |
| 2,764,715 | 9/1956 | Lorenz | 317/151 |
| 2,860,263 | 11/1958 | Sparrow | 307/140 |
| 2,922,085 | 1/1960 | Stidger | 317/151 |

*Primary Examiner*—Robert K. Schaefer
*Assistant Examiner*—William J. Smith
*Attorney*—Denny & Denny

ABSTRACT: A remote control circuit for controlling the application of power to a load by latching and unlatching a relay. The relay is controlled by a capacitor which is coupled to the relay by means of a plurality of switches which may be placed at different locations. The condition of the capacitor and its location in the circuit are selected such that current through the relay is alternately increased and decreased sufficiently to cause latching and unlatching in response to successive momentary closings of any of the switches.

INVENTOR.
JOSEPH W. TRINDLE
BY
Denny and Denny
HIS ATTORNEYS

REMOTE CONTROL CIRCUITS

BACKGROUND OF THE INVENTION

The present invention relates generally to circuits for controlling the application of power to a load from several different remote locations.

It is desirable to apply power to a load from any one of several locations and, in addition, be able to disconnect power from any of the same remote locations. It is also highly advantageous that as many remote control stations as desired be capable of being connected into the circuit in a simple and uncomplicated manner. Since power is commonly controlled by a large variety of switching devices including photoelectric, thermal, and semiconductor switches, a control circuit must be capable of operating in conjunction with such devices.

Accordingly it is an object of the present invention to provide a simple and efficient circuit for controlling the application of power from several remote locations.

It is a further object that such a remote control circuit be compatible with all of the commonly used sensing switches.

A further object is to provide a remote control circuit whose energy level is sufficiently low to permit complete safety against electric shock to personnel and also complete absence of fire hazard from ohmic heating or spark without the use of protected wiring or special spark protected switching devices.

Another object is to be able to add as many control stations as desired without any complicated changes in the circuitry.

A further object is to provide a remote control circuit which gives a continuous indication of the state of the circuit controlled.

BRIEF SUMMARY OF THE INVENTION

The control circuits of the invention provide a relay whose function is to connect and disconnect power to a load. The relay is controlled by a capacitor which responds to the closing of a switch in a plurality of control stations.

In one embodiment of the invention, the capacitor is charged in opposite directions depending on the condition of the load. When power is being applied to the load, the capacitor is charged in such a direction that upon closing the switch in the control station, the capacitor will discharge through the relay to deenergize the relay and disconnect the power supply. When power is disconnected, the capacitor will charge with a polarity such that upon again closing the switch in the control station, the relay will energize and power will be applied to the load.

In a second embodiment, a circuit is provided which can be used in conjunction with an electrolytic capacitor. In this circuit, the relay is energized by the surge of current into a charging capacitor and deenergized by connecting the charged capacitor in series with the relay to reduce the current through the relay. In this way, only one polarity of potential need be present across the capacitor in order to properly control power to the load.

DESCRIPTION OF THE PREFERRED EMBODIMENTS

Figure 1:
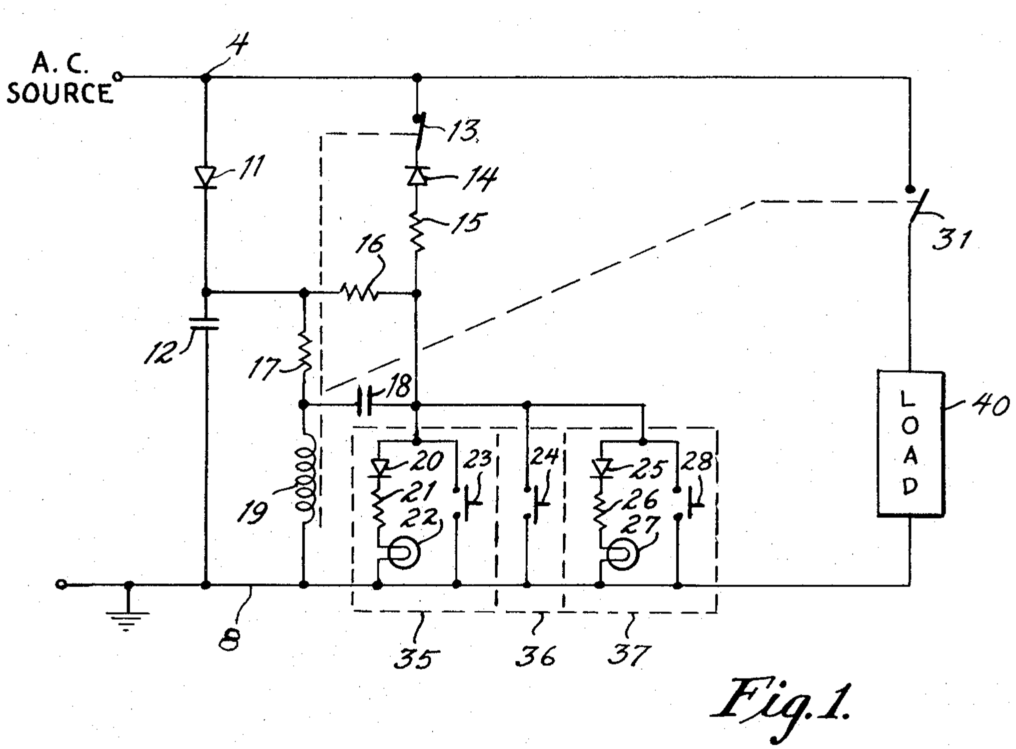
FIG. 1 is a the basic embodiment of the invention for remotely controlling power to a load.

In FIG. 1 a source of alternating voltage is connected between line 4 and ground bus 8. A load 40 is connected to the source through a pair of contacts 31. The contacts 31 are controlled by the relay 19. Three control stations 35, 36 and 37 are illustrated with each control station containing a momentary contact push button switch 23, 24 or 28. The overall operation of the circuit is to control the application of power to the load 40 from any of the control stations 35–37. The control stations in a practical circuit may be placed at different locations, throughout a building for example.

A more detailed description of the operation of the circuit of FIG. 1 will now be given. Diode 11 and capacitor 12 form a half-wave rectifier-filter combination and continuously supply a holding current through resistor 17 and relay 19 to ground. By selecting the time constant of capacitor 12 on discharge to be large relative to the duration of the half-wave pulses through diode 11, a relatively constant positive voltage with respect to ground is maintained at the junction between resistors 16 and 17. Substantially the entire voltage present at the junction between resistors 16 and 17 is dropped across resistor 17, neglecting, for simplicity of explanation, the slight voltage across relay 19 caused by the holding current. The holding current is insufficient in magnitude to latch relay 19, however, is sufficiently large to maintain the relay in an energized or latched condition. The magnitude of the holding current is set by properly choosing the value of the resistor 17, in conjunction with the known characteristics of the relay being employed.

The contacts 13 are controlled by relay 19 and are normally closed when relay 19 is deactivated. With contacts 13 closed, the diode 14 will conduct during negative half cycles of the source, thereby driving the side of the capacitor 18 connected to resistor 15 below ground potential while the other side of the capacitor 18 is held at approximately ground potential, neglecting the slight potential across relay 19. Thus during the negative half cycles in which diode 14 conducts, a charge collects on capacitor 18 with the side of capacitor 18 connected to relay 19 becoming positive.

Assuming the above discussed conditions to be present, when one of the pushbutton switches 23, 24 or 28 is momentarily depressed, capacitor 18 will discharge through relay 19, the discharge current being in the same direction as the holding current already flowing in the relay 19. The sum of these currents is sufficient to energize or latch the relay, thereby opening contacts 13 and closing contacts 31 and applying power to the load 40. The holding current supplied by diode 11 and capacitor 12 is sufficient to maintain relay 19 in the energized condition.

When the pushbutton which was depressed is subsequently released, capacitor 18 will charge to the resultant voltage present across resistors 16 and 17. As discussed previously, substantially the entire voltage present at the top of the capacitor 12 is dropped across resistor 17 since only the diode 11 and the relay 19 are in series with it across the source, both the diode 11 and the relay 19 having comparatively small voltages dropped across their terminals. Only a fraction of the voltage present at the top of the capacitor 12 is dropped across resistor 16 since it is in series with each of the parallel branches on the control stations 35–37, all of which contain an appreciable resistance. Thus, since the voltage across resistor 17 is large compared to the voltage across resistor 16, the capacitor 18 will charge with a polarity such that the side of the capacitor 18 connected to the relay 19 is negative.

If one of the switches 23, 24 or 28 is again momentarily closed, capacitor 18 will discharge through the relay 19 in a direction opposite to the direction of the holding current, thereby unlatching the relay. When relay 19 is deenergized, the contacts 13 are again closed and the contacts 31 are opened, cutting off power to the load 40. The capacitor 18 cannot be charged for its next operation until all pushbutton switches are released.

Successive momentary closings of the pushbutton switches 23, 24 or 28 will cause the above explained cycle to repeat. It can be seen that power can be turned on at one location and subsequently turned off from the same or a different location. As many control stations as desired can be employed.

The function of resistor 15 is to limit the current through diode 14 when a pushbutton is depressed. Diode 20, resistor 21 and neon 22, in control station 35 are used to indicate whether power is being supplied to the load. If power is flowing to the load 40, the capacitor 18 is charged sufficiently in the proper direction to forward bias diode 20 such that a sufficient current will flow to illuminate the neon bulb 22. If, on the other hand, power to the load 40 is turned off, the capacitor 18 would back bias the diode 20 and the neon would not light. Thus, the neon serves to indicate the condition at the load. The series circuit composed of elements 25, 26 and 27 operates in a similar fashion to monitor the power to the load 40.

It should be noted that by reversing the polarity of the diodes 20 and 25 in the control stations 35 and 37, the sense of the indicator neons 22 and 27 would also be reversed. Thus, by reversing the polarity of the diodes 20 and 25, the neons 22 and 27 would be illuminated when power was not being applied to the load. This latter type of connection would be desirable if the load being controlled was a room light, in which case the neon would provide a source of illumination for the pushbutton during the night time hours.

Figure 2:
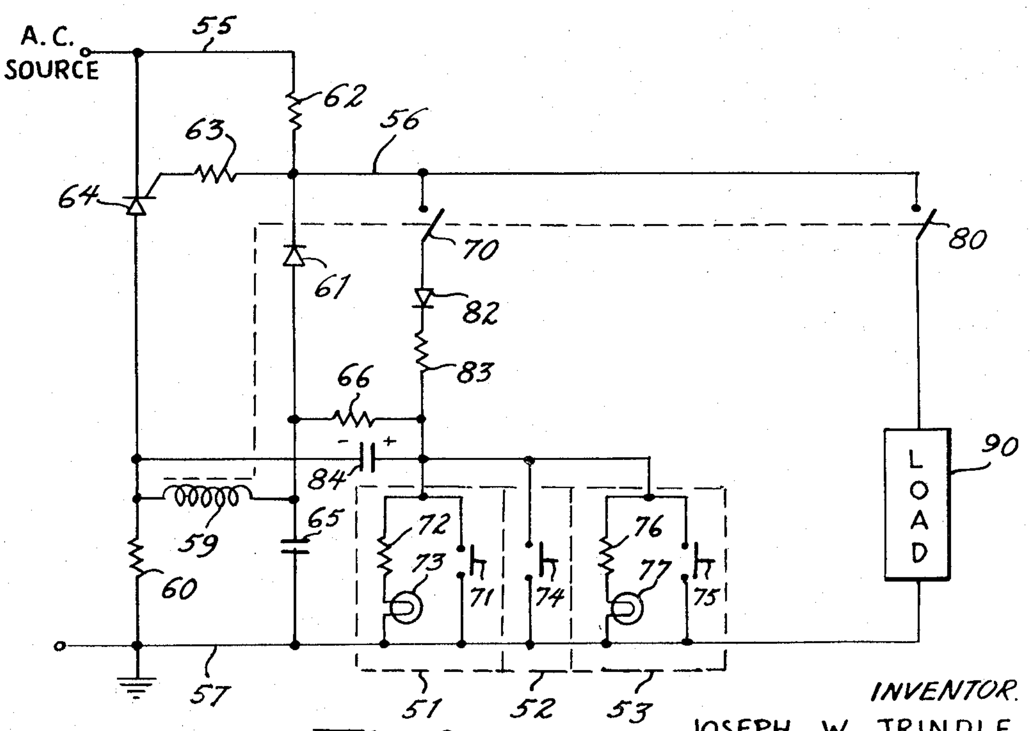
FIG. 2 is an alternative embodiment of the invention utilizing the same basic principles as in FIG. 1, but capable of operating with an electrolytic capacitor.

FIG. 2 shows a second embodiment of the invention which incorporates an electrolytic capacitor as the relay controlling element. Electrolytic capacitors can only be charged in a single direction and thus are not usable in the circuit of FIG. 1. Since such capacitors are less expensive and more compact, it would be advantageous to provide a remote control circuit which operates on basically the same principle as the circuit of FIG. 1 but which could utilize an electrolytic capacitor. In addition, the circuit of FIG. 2 incorporates a silicon controlled rectifier as a means of overload protection.

Looking at FIG. 2 it is seen that a source of alternating current and ground are connected to the lines 55 and 57 respectively. The contacts 80 control power to load 90 and in turn are responsive to relay 59. Contacts 70 are likewise responsive to the relay 59. Electrolytic capacitor 84 controls the latching and unlatching of the relay 59 and is the key element in the operation of the circuit. Control stations 51–53 each contain a switch 71, 74 and 75 respectively which controls the latching of relay 59. The successive closings of any one of the switches 71, 74 and 75, control power to the load 90 by connecting either a charged or uncharged capacitor 84 across the resistor 60. The resistor 72 and neon 73, connected in parallel with the switch 71 in control station 51, serve to indicate the condition of the circuit 53. Control station 52 is shown in its simplest form as consisting of only a switch 74. The SCR 64 operates to protect the circuit in case of an overload.

The operation of the circuit of FIG. 2 will now be explained in more detail. With the diode 61 connected as shown, and the pushbutton switches 71, 74 and 75 in an open position, a holding current will flow through relay 59 from ground through resistor 60, relay 59, diode 61 and resistor 62. This holding current is of insufficient magnitude to actuate or latch the relay 59, however, it is sufficient to hold the relay in an activated or energized condition once it is pulled in. Smoothing capacitor 65 is a part of the holding current supply and acts to keep current flowing through the relay 59 during the nonconducting half cycle of diode 61.

Electrolytic capacitor 84 is the key relay control element of the circuit. Resistor 66 is selected such that with the load disconnected, contacts 70 and 80 open, and the pushbutton switches open, the capacitor 84 will be discharged or charged very slightly in the direction opposite to that shown in FIG. 2. If, at this time, one of the pushbutton switches is closed, the capacitor 84 will short circuit resistor 60 causing a surge of current through the relay 59 in the same direction as the holding current. The increase in the current through the relay is sufficient to cause it to latch, thereby closing contacts 70 and 80 and applying power to load 90. When the pushbutton, which was initially depressed, is released, the capacitor 84 will continue to charge through closed contact 70, diode 82, and resistor 83 to a higher potential difference than if its circuit were completed to ground because its circuit is completed to the top of resistor 60 which is at a negative potential. Capacitor 84 is therefore charged to a considerably higher voltage than capacitor 65.

If now either the same pushbutton or another in any of the control stations is depressed, the voltage at the top of resistor 60 will jump to a higher negative value than the negative value at the top of capacitor 65, thus reversing the direction of the voltage across relay 59 and causing it to unlatch. When relay 59 unlatches, the contacts 70 and 80 are again opened and power to the load 90 is turned off. With the pushbutton switches all open, the charge remaining on capacitor 84 will readjust through resistor 66 which tends to reverse the polarity across the capacitor rather than merely to bring it to zero in order to reduce reset time. Capacitor 84 can now effectively short resistor 60 on the next closing of a pushbutton. The cycle explained above will repeat itself on successive closings of any of the switches 71, 74 and 75 in the control stations.

Similar to the corresponding elements of FIG. 1, the neons 73 and 77 operate to indicate the condition of the load. When the contacts 70 are open, a sufficiently large voltage is impressed across the neons 73 and 77 to cause them to light. However, with the contacts 70 closed, the potential drop across the resistor 83 is selected to be sufficiently large to cause the peak voltage on the side of the capacitor 84 to be below the ignition voltage of the neon lamps. Thus in the circuit of FIG. 2, the neons will give a positive indication of the condition of the load.

The SCR 64 operates to disconnect the load 90 when overload conditions occur. A sufficiently high current through resistor 62 will turn the controlled rectifier on, which will bypass sufficient current from the relay 59 to unlatch it, thereby disconnecting power from the load 90.

It can be seen that a great variety of switches can be employed in FIG. 1 and 2 in place of the pushbutton type shown. For instance, heat, light or pressure sensitive switches could be employed to control the application of power.

Having described this invention, I claim:

1. A remote control circuit comprising, a pair of terminals for connection to a source of alternating voltage, a relay coupled to said terminals, a first contact means responsive to actuation by said relay for connecting a load to said terminals, holding circuit means coupled to said relay and said terminals for supplying a holding current to said relay, said holding current being insufficient to energize said relay but sufficient to hold it in an energized condition, a plurality of switches coupled to said relay, relay energizing circuit means coupled to said switches for increasing the current through said relay in response to the closing of any one of said switches when said relay is deenergized, said relay energizing circuit means including a capacitor, and circuit means coupled to said capacitor for holding said capacitor in a substantially discharged condition when said relay is deenergized and said switches are open, said capacitor and said plurality of switches connected in series with each other and said relay across said source, and relay deenergizing circuit means coupled to said switches for decreasing the current through said relay in response to the momentary closing of any one of said switches when said relay is energized, whereby power to said load can be controlled from different locations corresponding to the location of said plurality of switches.

2. The combination recited in claim 1 wherein said deenergizing circuit means comprises, charging circuit means coupled to the capacitor for charging the capacitor when said relay is energized and said switches are open, with the proper polarity to decrease the current through said relay when one of said switches is closed, whereby closing one of said switches when said relay is energized, deenergizes said relay and opens said first contact means.

3. The combination of claim 2 further including means for deenergizing said relay upon the occurrence of a sufficiently high current form said source.

4. The combination recited claim 2 further including, means coupled to said capacitor for indicating the condition of said relay.

5. A remote control circuit comprising first and second terminals for connection to a source of alternating voltage and ground respectively, a first diode and a first capacitor in series with each other across said terminals to provide a source of filtered DC voltage, a first resistor and a relay connected in series with each other across said first capacitor for providing a holding current through said relay, said holding current being insufficient to energize said relay but sufficient to maintain said relay in an energized condition, a second capacitor and a plurality of switches connected in series with each other across said relay, one side of said relay and one end of each of said switches being held at ground potential by connection to said second terminal, each of said switches, when closed, connecting said capacitor across said relay, first contact means for connecting said terminals to a load in response to the energization of said relay, first circuit means including second contact means, a second diode and a second resistor in series with each other and each of said plurality of switches across said first and second terminals, said second contact means responsive to said relay and being closed when said relay is deenergized and open when said relay is energized, said second diode poled to conduct on alternate half cycles of said supply when said first diode is nonconductive, said first circuit means charging said second capacitor with a first polarity when said second contact means is closed, second circuit means including said first resistor for charging said capacitor with a second polarity when said second contact means are open and said relay is energized, whereby on successive momentary closings of any of said plurality of switches said capacitor is discharged through said relay in opposite directions to alternately energize and deenergize said relay.

6. The combination recited in claim 5 further comprising monitoring means for indicating the condition of said relay.

7. The combination recited in claim 6 wherein said monitoring means comprises, means for sensing the polarity of the charge on said capacitor.

* * * * *